(12) United States Patent
Nagda et al.

(10) Patent No.: US 7,302,430 B1
(45) Date of Patent: Nov. 27, 2007

(54) WORKFLOW MANAGEMENT SYSTEM FOR GENERATING OUTPUT MATERIAL BASED ON CUSTOMER INPUT

(75) Inventors: Jagdish Mooljee Nagda, Boulder, CO (US); Robert Curt Nielsen, Longmont, CO (US); Gerri Lynn Peper, Hygiene, CO (US)

(73) Assignee: International Business Machines Corporation, Armonk, NY (US)

( * ) Notice: Subject to any disclaimer, the term of this patent is extended or adjusted under 35 U.S.C. 154(b) by 802 days.

(21) Appl. No.: 09/388,261

(22) Filed: Aug. 31, 1999

(51) Int. Cl.
G06F 17/30 (2006.01)
(52) U.S. Cl. ............... 707/9; 707/3; 707/203
(58) Field of Classification Search ............... 707/1–10, 707/100–104.1, 501, 517, 200–205; 709/203, 709/217, 250, 201, 231; 705/14, 79, 27, 705/80, 34, 52, 54, 26, 41, 412, 51; 455/3.04
See application file for complete search history.

(56) References Cited

U.S. PATENT DOCUMENTS

| | | |
|---|---|---|
| 4,853,852 A | 8/1989 | Rosen |
| 5,276,793 A | 1/1994 | Borgendale et al. |
| 5,313,394 A | 5/1994 | Clapp |
| 5,493,490 A | 2/1996 | Johnson |
| 5,548,506 A | 8/1996 | Srinivasan |
| 5,555,496 A * | 9/1996 | Tackbary et al. ............. 705/27 |
| 5,557,723 A | 9/1996 | Holt et al. |
| 5,566,278 A | 10/1996 | Patel et al. |
| 5,581,691 A | 12/1996 | Hsu et al. |
| 5,619,635 A | 4/1997 | Millman et al. |
| 5,627,764 A | 5/1997 | Schutzman et al. |
| 5,627,973 A | 5/1997 | Armstrong et al. |
| 5,649,220 A | 7/1997 | Yosefi |
| 5,692,206 A | 11/1997 | Shirley et al. |
| 5,696,965 A | 12/1997 | Dedrick |
| 5,710,884 A | 1/1998 | Dedrick |
| 5,717,923 A * | 2/1998 | Dedrick ...................... 707/102 |

(Continued)

FOREIGN PATENT DOCUMENTS

WO    WO 9908205    2/1999

OTHER PUBLICATIONS

International Business Machines Corporation, IBM InfoPrint 4000 Direct Mail Printer, Sep. 1997 (c) 1997.

(Continued)

*Primary Examiner*—Mohammad Ali
(74) *Attorney, Agent, or Firm*—David W. Victor; Konrad Raynes & Victor LLP

(57) ABSTRACT

Disclosed is a method, system, and program for an automated creation and delivery system for generating customer output information. A customer record in a first database table is interactively generated to include fields specifying at least one product, preferences, and a selected output method to deliver output material on the product specified in the customer record. At least one customer record in the first database is received and at least one content file is accessed by processing a second database table using values in one received customer record. The content of each accessed file is then generated into the output material. A selected one of a plurality of delivery options is determined from the customer record and the output material is transmitted via the determined delivery option to the customer specified in the customer record.

29 Claims, 8 Drawing Sheets

U.S. PATENT DOCUMENTS

| | | | |
|---|---|---|---|
| 5,721,827 A * | 2/1998 | Logan et al. | 709/217 |
| 5,724,521 A | 3/1998 | Dedrick | |
| 5,729,751 A | 3/1998 | Schoolcraft | |
| 5,734,719 A | 3/1998 | Tsevdos et al. | |
| 5,740,549 A | 4/1998 | Reilley et al. | |
| 5,752,246 A | 5/1998 | Rogers et al. | |
| 5,754,939 A * | 5/1998 | Herz et al. | 455/3.04 |
| 5,778,368 A | 7/1998 | Hogan et al. | |
| 5,778,377 A | 7/1998 | Marlin et al. | |
| 5,790,790 A | 8/1998 | Smith et al. | |
| 5,826,020 A | 10/1998 | Randell | |
| 5,826,239 A | 10/1998 | Du et al. | |
| 5,832,504 A | 11/1998 | Tripathi et al. | |
| 5,862,404 A | 1/1999 | Onaga | |
| 5,870,545 A | 2/1999 | Davis et al. | |
| 5,893,075 A | 4/1999 | Plainfield et al. | |
| 5,893,111 A | 4/1999 | Sharon, Jr. et al. | |
| 5,918,226 A | 6/1999 | Tarumi et al. | |
| 5,940,804 A | 8/1999 | Turley et al. | |
| 5,964,156 A | 10/1999 | Smith et al. | |
| 6,029,195 A * | 2/2000 | Herz | 725/116 |
| 6,056,413 A | 5/2000 | Urso | |
| 6,058,413 A | 5/2000 | Flores et al. | |
| 6,088,679 A | 7/2000 | Barkley | |
| 6,115,646 A | 9/2000 | Fiszman et al. | |
| 6,144,975 A | 11/2000 | Harris et al. | |
| 6,151,583 A | 11/2000 | Ohmura et al. | |
| 6,233,537 B1 | 5/2001 | Gryphon et al. | |
| 6,289,513 B1 | 9/2001 | Bentwich | |
| 6,301,621 B1 | 10/2001 | Haverstock et al. | |
| 6,311,192 B1 | 10/2001 | Rosenthal et al. | |
| 6,345,256 B1 | 2/2002 | Milsted et al. | |
| 6,370,521 B1 | 4/2002 | Pigos et al. | |
| 6,389,446 B1 | 5/2002 | Torii | |
| 6,466,935 B1 | 10/2002 | Stuart et al. | |
| 6,483,524 B1 | 11/2002 | Petchenkine et al. | |
| 6,571,279 B1 * | 5/2003 | Herz et al. | 709/217 |
| 6,578,006 B1 | 6/2003 | Saito et al. | |
| 2002/0046072 A1 | 4/2002 | Arai et al. | |
| 2003/0154115 A1 | 8/2003 | Lahey et al. | |

OTHER PUBLICATIONS

International Business Machines Corporation, Centralized Output Management, Sep. 1997 (c) 1997.

International Business Machines Corporation, InfoPrint Manager Fax and E-Mail, Aug. 1998 (c) 1998.

International Business Machines Corporation, IBM Enhances 1-to-1 Marketing Solution with New Technology and New Capabilit (c) 1998.

U.S. Appl. No. 09/422,593, filed Oct. 21, 1999, Database Driven Workflow Management System for Generating Output Material Based on Computer Input.

Fingar, P. "A blueprint for open ecommerce," Component Strategies vol. 1, No. 5, Nov. 1998. (Abstract).

Royles, et al. "Dynamic tailoring of law related documents to user needs," Proc. 9th Int'l Workshop on Database and Expert Systems Applications (Cat. No. 98EX130), 1998. (Abstract).

Addison, E.R. "Synthesizing summary knowledge from distributed heterogeneous information sources," MILCOM 97 Proc. (Cat. No. 97CH36134), 1997. (Abstract).

Milosavljevic, et al. "Dynamic catalogues on the WWW," Computer Networks and ISDN Systems, vol. 30, No. 1-7, Apr. 1998. (Abstract).

Kipphan, H. "The future of printing: changes and challenges, technologies and markets," Proc. SPIE—Int. Soc. Opt. Eng. (USA), 1998. (Abstract).

O'Hagan, L. "Dynamic composition of personalised documents," Proc. SHARE Europe Anniversary Meeting, 1992. (Abstract).

McMahon, T. J. "Sales automation: for many companies, a 'final link' in global management," Business Marketing, vol. 78, No. 5, May 1993. (Abstract).

Seybold Editors' Hot Picks for Seybold San Francisco Publishing 98 (online), retrieved on Aug. 29, 1999 from Internet at http://www.seyboldseminars.com/Events/sf98/hotpicks-print.htm (URL inactive).

* cited by examiner

| Customer Contact | |
| Customer Name | |
| Customer Address | |
| Contact Phone | |
| Fax Number | |
| E-Mail Address | |
| Industry Type | Manufacturing ▼ |

Customer ⦿ Business ○ Technical

*Fig. 2a*

| | |
|---|---|
| Type of Printing | Continuous Forms ▼ |
| Customer's current issue with Printers: | High maintenance ▼ |
| Associated services to be included | Distributed print services ▼ |

Select either Products or Family

Products ▼

Product

1 InfoPrint 32 ▼

2 None ▼

3 None ▼

Or

Family of Products  None ▼

Delivery Method ▼
None
Print
Fax
e-mail

| Fig. 3A |
|---|
| Fig. 3B |

Fig. 3A

IBM 3130 ⁓50

A reliable, high-throughput printer for cross-industry network applications

52 ⟶

The highly reliable, cut-sheet IBM® 3130 Advanced Function Printer combines quality printing and media flexibility with multiple-interface networking. The printer's advanced controller technology simplifies the printing operations of complex computing environments.

Environment sharing

Today's complex computing environments require a printer to support multiple data streams and network connections. The IBM 3130 natively supports PostScript® Level 2, PCL5e, and IPDS™ data streams, as well as data stream sensing and switching. With these capabilities, the IBM 3130 can print from both host and Local Area Network (LAN) connections with efficiency. The printer can also support three network interfaces simultaneously. Open system attachments include Token-Ring, Ethernet and PC Parallel interfaces.

54 ⟶

Highlights

- *A reliable, high throughput at up to 30 ipm, and up to 200,000 impressions per month*
- *Supports multiple data streams including PostScript Level 2, PCL5e and IPDS* — 60
- *Handles seven paper sizes including A3/ledger (11"x 17") paper*
- *Connects to three network interfaces simultaneously* — 62
- *Offers duplex model for two sided printing*
- *Separates print jobs with dedicated input trays and output stackers* — 64
- *Supports up to four input trays that hold 3,000 sheets of paper*

Media flexibility — 56

In addition to card stock and labels, the IBM 3130 handles all popular paper types and seven paper sizes, including A3/ledger (11"x17") paper. With an input capacity of up to 3,000 sheets, an output capacity of up to 2,500 sheets, and a print speed of 30 ipm, the IBM 3130 easily handles large-volume print jobs. To retain print job separation, each input tray and output stacker can be linked and dedicated to a specified application.

Advanced controller performance

The IBM 3130 leverages the power of the Advanced Function Common Control Unit™ (AFCCU™) to ensure quality, performance, reliability and efficiency. The control unit's RISC technology incorporates attachment flexibility so the printer can support Intelligent Printer Data Stream™ (IPDS) environments as well as LAN environments. the AFCCU supports.

58 ⟶

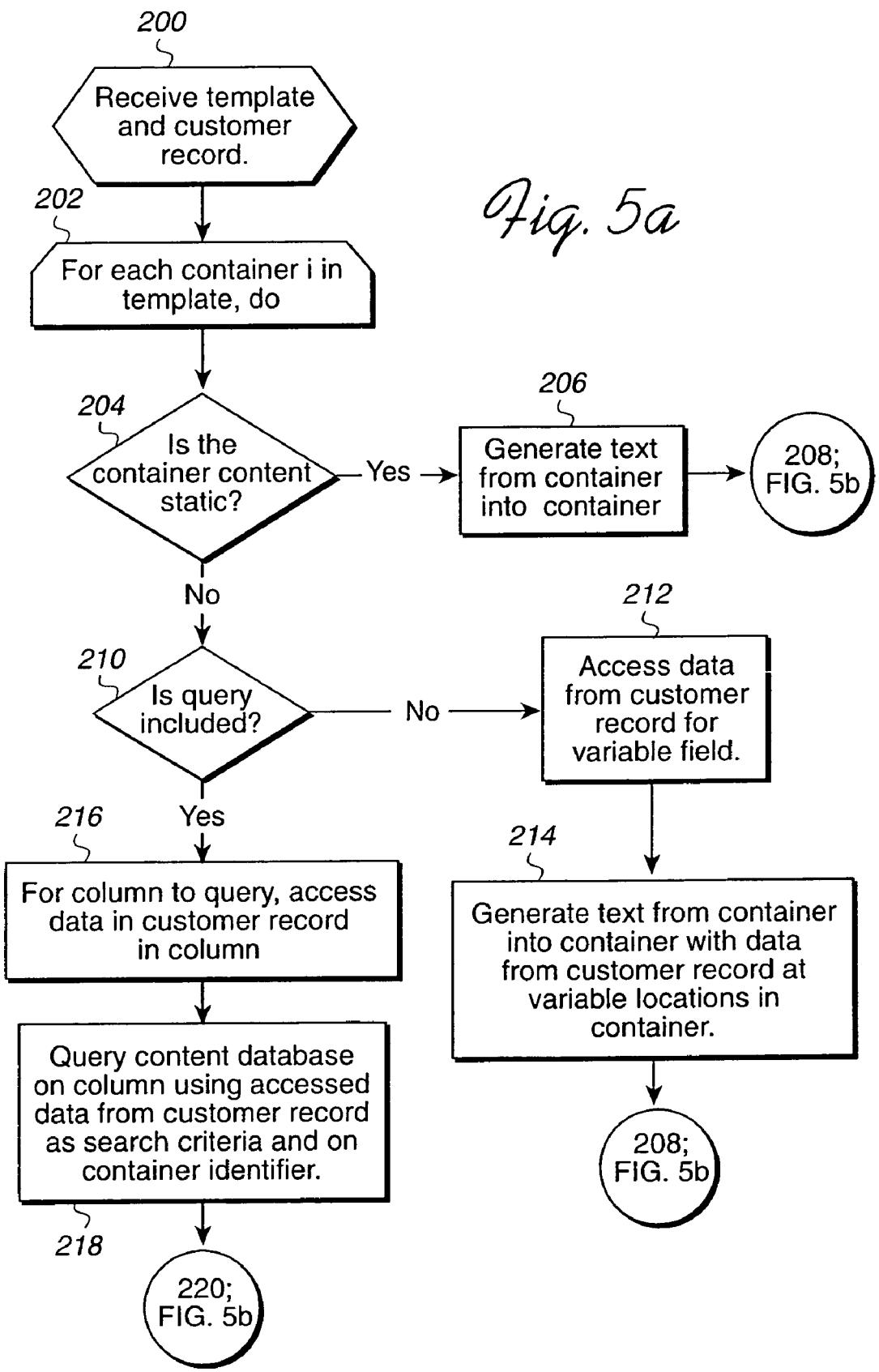

WORKFLOW MANAGEMENT SYSTEM FOR GENERATING OUTPUT MATERIAL BASED ON CUSTOMER INPUT

BACKGROUND OF THE INVENTION

1. Field of the Invention

The present invention relates to method, system, and program for automated creation and delivery of customer output and, in particular, output material based on customer input.

2. Description of the Related Art

Direct mail printers and printer software allow a user to generate and print marketing materials tailored for different customers. Many systems have a database of customer information and merge the customer information from the database into customer marketing material forms that are then mailed or otherwise distributed to the customer. Typically, the marketing material forms have variable fields into which the customer information is inserted from the database during the process of merging the forms with the database data.

The effectiveness of a direct mail marketing campaign can be significantly improved by customizing the content of marketing materials to each customer's needs and situation. Existing and potential customers will more likely pay attention to marketing materials that appear to directly address issues that are pertinent to the customer. Likewise, customers will tend to ignore marketing materials that include information that is irrelevant to the their needs and preferences. Thus, computerized direct mail marketing methods continually seek to provide ways to further customize direct mail marketing materials to the specific needs and desires of customers.

One current problem with customized mail marketing is that substantial human intervention is needed to gather the customer information and prepare the generated customized marketing material for distribution. After the files are generated they are typically printed, then placed in an envelope. There can often be a considerable lag time between the time customer information is gathered and the customized materials are generated, then mailed to the customer.

Delivery of non-customized marketing material can occur instantly, and is sometimes transmitted via facsimile or electronic mail. However, for the reasons discussed above, non-customized marketing material is not as effective a marketing tool as customized information.

Accordingly, there is a need in the art for an improved system, method, and program for generating and delivering tailored marketing materials to existing and potential customers.

SUMMARY OF THE PREFERRED EMBODIMENTS

To overcome the limitations in the prior art described above, preferred embodiments disclose a system, method, and program for a automated creation and delivery system for generating customer output information. A customer record in a first database table is interactively generated to include fields specifying at least one product, product demands, product preferences, and a selected output method to deliver output material on the product specified in the customer record. At least one customer record in the first database is received and at least one content file is accessed by processing a second database table using values in one received customer record. The content of each accessed file is then generated into the output material. A selected one of a plurality of delivery options is determined from the customer record and the output material is transmitted via the determined delivery option to the customer specified in the customer record.

In further embodiments, the customer records in the first database are generated by a human operator interacting with a customer to determine customer demands and preferences.

In still further embodiments the delivery options include electronic mail, facsimile, and postal mail. In such case, the output material is automatically transformed to a format compatible with the selected delivery option, wherein a different format is used for each delivery option, wherein the transformed output is transmitted to the customer via the selected delivery option.

Preferred embodiments provide a automated creation and delivery system to generate customer records in a database that are used to determine the output to generate onto a template, which when generated includes the tailored marketing information to send to the customer. After generating the output materials, the output materials are then transferred to an output device to deliver to the customer according to a customer specified delivery method. Thus, the preferred automated creation and delivery system comprises obtaining client information concerning products, preferences and demands through an operator questioning the client and using this customer data to generate output materials tailored to the customer's needs, which may then be automatically transferred via different possible transmission routes to the customer that were requested by the customer.

BRIEF DESCRIPTION OF THE DRAWINGS

Referring now to the drawings in which like reference numbers represent corresponding parts throughout:

FIGS. 2a and 2b illustrate an entry form to enter a customer record in accordance with preferred embodiments of the present invention;

FIGS. 5a and 5b illustrate logic to generate marketing material in accordance with preferred embodiments of the present invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Computing Environment

Figure 1:
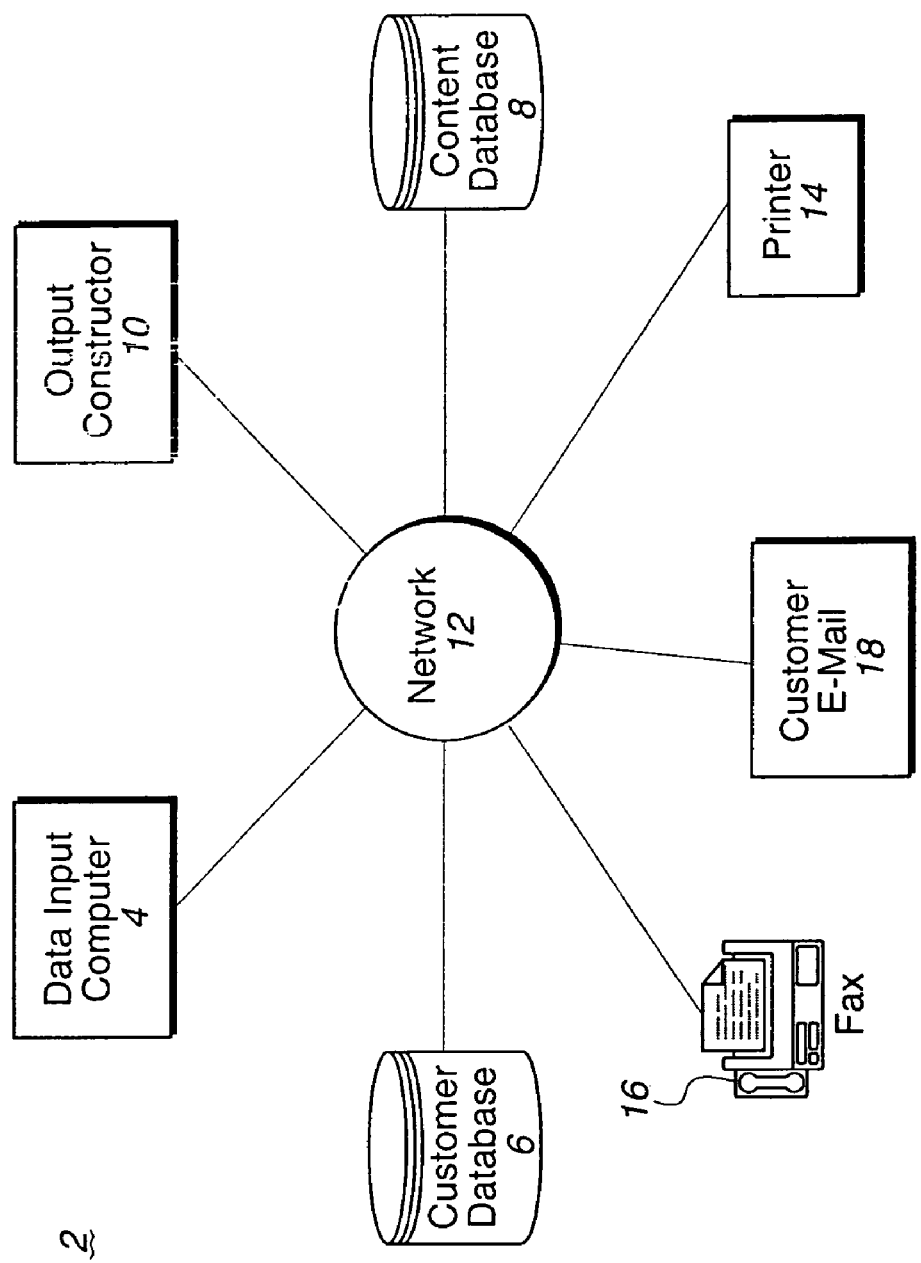
FIG. 1 is a block diagram illustrating a computing environment in which preferred embodiments of the present invention are implemented.

FIG. 1 illustrates a network environment 2 in which preferred embodiments are implemented. One or more data input centers 4 are used to gather information on existing and potential customers and store the information in customer records in a customer database 6. A content database 8 is comprised of files that include content to insert into a template describing a layout of the marketing materials (discussed below). The content of the files in the content database 8 may comprise any image and text type known in the art, including three dimensional images, holographic images, watermark, etc. Further, if the marketing pages are to be viewed in a Java enabled or other multi-media viewer, then the file may include video images, sound files, three dimensional images, and any other multi-media format known in the art.

An output constructor 10 receives the template and using information in a customer record from the customer database 6 and the content database 8 populates the template with marketing information tailored for the customer. After generating direct marketing material comprised of the populated template in accordance with preferred embodiments described below, the output constructor 10 may then direct the marketing material to a printer 12 for printing or to a facsimile (fax) machine 14 for facsimile transmission to the targeted customer. Further, the marketing materials may be converted into a portable format, such as an Hypertext Mark-Up Language (HTML) or XML page or in the an ADOBE ACROBAT format to transmit to the customer via e-mail 16. A network 12 provides communication among the data input computer 4, customer database 6, content database 8, output constructor 10, printer 14, fax machine 16, and e-mail gateway 18 to customers. The network 18** may be comprised of any network system known in the art including TCP/IP network (e.g., an Intranet, the Internet), LAN, Ethernet, WAN, Token Ring, etc. Alternatively, there may be separate and different networks between the components.

**AIX, OS/2, and RS/6000 are registered trademarks of IBM and OS/390 and MVS are trademarks of IBM; WINDOWS is a registered trademark of Microsoft Corporation; UNIX is a registered trademark licensed by the X/Open Company LTD; ADOBE ACROBAT is a registered trademark of Adobe System, Inc.; PAGEFLEX is a trademark of Bitstream, Inc.

The data input computer 4 and output constructor 10 would include an operating system such as MICROSOFT WINDOWS 98, WINDOWS NT, AIX, OS/390, OS/2, MVS, and may be comprised of any suitable server and client architecture known in the art. The output constructor 10 would include software suited for processing multiple large print jobs, such as the IBM InfoPrint manager software that runs on the IBM RS/6000 server under the AIX operating system.

The customer 6 and content 8 databases maybe located on the same database server or on separate database servers. The data input computer 4 and output constructor 10 would include client database software to communicate with the server(s) including the customer 6 and content 8 databases. The client/server database software to implement the customer 6 and client 8 databases in the network 2 may be comprised of any client/server database program known in the art, such as IBM DB2, Oracle Corporation's ORACLE 8, etc. The client/server database software would allow the data input computer 4 and output constructor 10 to transfer data, execute SQL queries, and update data with respect to the customer 6 and content 8** databases in a manner known in the art.

The printer 14 may be any large scale printer capable of mass printing marketing materials, such as the IBM Info-Color 70. The facsimile machine 14 is preferably capable of handling multiple facsimile transmissions at a time to batch process facsimile jobs. For instance, the output constructor 10 may immediately transmit generated output or, alternatively, save generated output for later batch processing of the transmission operations. Details of the InfoPrint manager and printing documents to alternative output devices such as e-mail and fax machines is described in the IBM publication, "IBM InfoPrint Manager for AIX: Administrators Guide Version 3, Release 1," IBM Document No. S544-5595-00 (October 1998), which publication is incorporated herein by reference.

Gathering Customer Information

In preferred embodiments, detailed information about a customer may be gathered by an operator at a marketing call center. The operator at the marketing call center speaks with a representative of the customer and enters information at the data input computer 4 into a customer database record for that customer. The operator would enter the data into a database entry form. FIGS. 2a and 2b provide an example of a customer record database entry form, showing two different scrolled areas of the same page, including customer information fields. With respect to FIG. 2a, the customer contact field could include information on the contact person of the customer. Further fields may be provided for the address title, mail-stop, etc., of the contact. The customer name and location fields may include further sub-fields for the address components of the customer location. The industry type field indicates the industry in which the customer operates and the customer boolean field indicate whether the customer is a business or technical entity. For instance, this may indicate whether the contact has specific technical knowledge and understanding of the equipment or is focused on less technical, business operations.

FIG. 2b shows further fields in the customer record, including the type of printing of interest to the customer; concerns the customer has about the printer product (customer's current issue with printers); associated services of interest. This page also allows the operator to enter information on the services and features of interest to the customer. Below is a drop down list to allow the operator to select a desired delivery method for the customer. Upon selecting a delivery method, the program would prompt the user to enter customer address information for the delivery method, e.g., e-mail address, fax number, street address, etc.

Each of the fields included in the customer record entry form illustrated in FIGS. 2a and 2b generates information into fields or columns of a database record for the customer. The customer database would include a column for each field of information provided in the form. A customer record is created each time the operator fills in information for a product of interest to the customer. Thus, if the customer is interested in different products, then different customer records would be generated, one for each product. The customer records are stored in a table in the customer database 6.

Alternatively, information to enter into the customer record fields (columns) may be mined from a database of information on the customer. This database is mined to gather information that can then be inserted into customer records.

The arrangement and selection of fields to include in customer records would be determined during the design of the layout of the template. A template would be designed to include information on the product. A template is comprised of containers, which are sections into which files from the content database 8 are inserted. Each of the files in the content database 8 include metadata in the form of a database record in the content database 8 that provides attributes associated with the file. The metadata would include fields or columns of information that corresponds to the fields in the customer record. Thus, the meta data for a particular file could indicate whether the information is for a business or technical oriented contact, corresponding to the business or technical selection in the customer record and a size of the company, along with other indicators of preferences addressed by the file. For instance, a file could include information tailored to a non-technical person at a large company. The needs of a large company are quite distinct from that of a small company. Thus, the files inserted into the container may be customized depending on both the background of the contact and size of the company. In this way, there is a correspondence of fields (columns) in the customer records in the customer database 6 and fields (columns) the metadata records for each file in the content database 8.

A search engine would query the metadata record of a file using data entered in the fields of a customer record, such that a file is selected having metadata attributes matching attributes associated with the customer in the customer record. The query may query the metadata records on multiple attributes from the customer record, e.g., contact background (e.g., technical or business), size of company, and some other customer preference.

The template bridges files in the content database 8 and the customer records in the customer database 6 to generate tailored marketing material. In this way there are two levels of customization, one based on generating information directly from the customer record to the template and the second is based on using the preferences and information in the customer record to query and select a file that includes content tailored to the customer expressed preferences based on multiple degrees of customization, e.g., size, contact background, and any other preferences. Thus, a file to insert into a container may be queried on multiple customizing variables, i.e., multiple customer specific attributes entered in the customer record in the customer database 6. With this multi-level customized, a customized file may be selected to generate customize information in a container and the customized information may include external references to data in the customer record to provide a second layer of customization to the container.

Figure 3B:
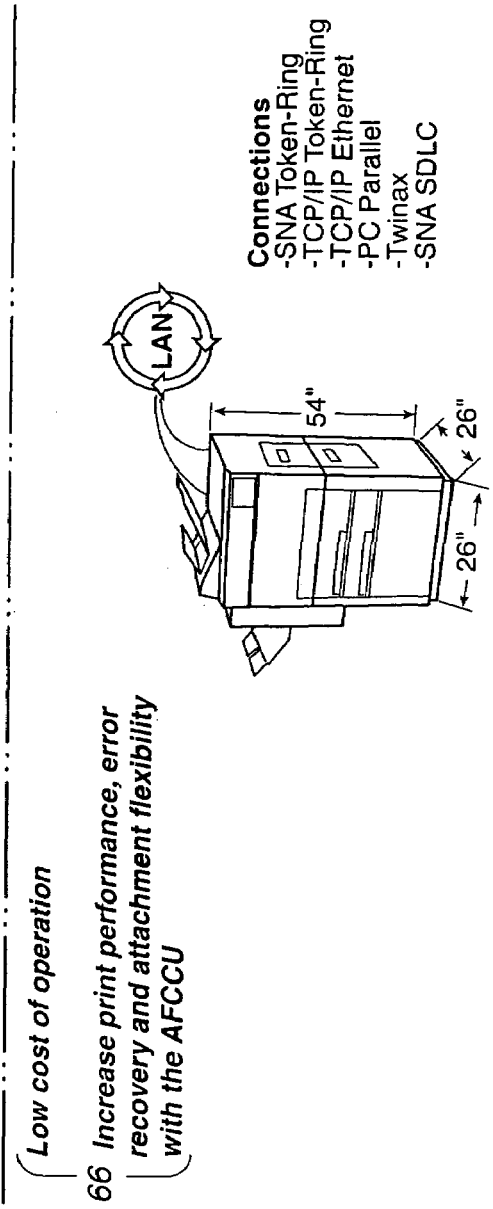
FIG. 3 illustrates an example of marketing material generated in accordance with preferred embodiments of the present invention.
Figure 4:
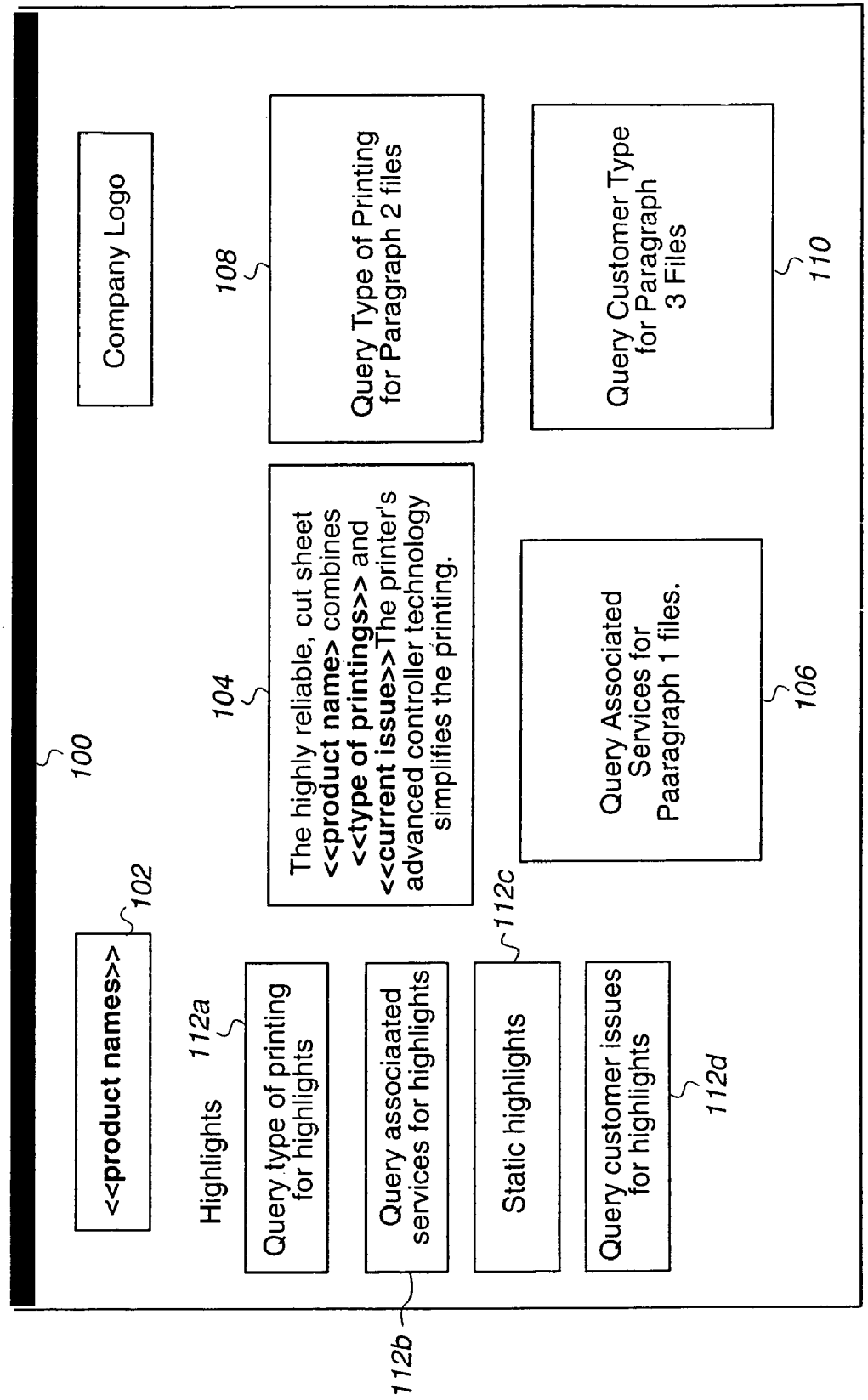
FIG. 4 illustrates an example of a layout of a template used to generated tailored marketing material in accordance with preferred embodiments of the present invention.

FIG. 3 illustrates an example of a marketing brochure produced in accordance with the preferred embodiments. A designer would design the layout of a template including containers, which are regions of the template into which content from files from the content database 8 are inserted. FIG. 4 illustrates a template 100 in which the user defines the layout of how content in the files in the customer 6 and content databases 8 will be inserted into the template 100 to generate the marketing material. The designer creates containers within the template 100. A product name container 102 displays the name of the product of interest to the customer. This information is accessed directly from the Product field (shown in FIG. 2b) of the customer record and displays the product name, numbered as 50 in FIG. 3.

An introduction container 104 includes a reference to an introductory file. As shown in container 104, the introductory file includes static text and references to variable data in the customer record. The introductory container 104 may also include a query of introduction files based on contact background (technical or business) and the size of the company. This would select an introduction file including information tailored to the contact background and company size. The introduction container 104 further includes the ability to insert variable customer information from the customer record directly into the introduction text to tailor the introduction to the customer, the contact background, and the company size.

A first paragraph container 106 includes the first paragraph following the introduction. To access files from the content database 8 to insert into a container, the designer would insert an SQL query into the container 106 to query the metadata records in the content database 8 to find a file that matches the queried value from the customer record. The content database 8 is set-up such that there are numerous files created for each container. The metadata of each file associates each file with one of the containers. The metadata includes further includes values in one or more columns (fields) that correspond to fields in the customer record including operator entered customer preferences. For instance, there may be numerous files dedicated to paragraph 1, each having in the associated services column one of the possible values for this column that could be entered for the customer. Further each file for paragraph 1 may have further degrees of customization upon the contact background and company size. The container 106 includes an SQL query to query the "associated services" column in the metadata record for a value that matches the value for this same column in the customer record. Thus, the container 106 includes the type of query, i.e., columns that will be queried, and the search criteria for the query is determined dynamically from the customer record. FIG. 3 shows an example of the paragraph 1 inserted, numbered as 54, when Environment Sharing was entered as an associated service to include for the customer.

Similarly, container 108 includes a query on the type of printing. This searches the files for paragraph 2 that have a "type of printing" column value that matches the type of printing in the selected customer record. In the example, the customer record, in FIG. 2b, shows the "type of printing" as continuous forms. This would cause the selection of a file including in its associated metadata indication that it is a paragraph 2 file and that has a value of "continuous forms" in the "type of printing" column. As shown in FIG. 3, the "continuous forms" value causes the insertion in the paragraph 2 container 108 of a file including information on media flexibility, numbered 56 in FIG. 3, which describes the type of forms and data that may be driven through the system.

The above description highlights how a designer would design the template 100, format of the customer records (FIGS. 2a, b), and the files and metadata to include in the content database. First the designer would determine the containers to include in the template and then the type of content to include in each container that would interest the customers. The designer would then determine a way to describe different attributes values for the ways in which the interest could be classified. The customer record entry form would be designed to allow an operator to select one of multiple attribute values for the interest. Further, the files to fill in the container associated with the customer interests and demands would include a field indicating the container with which it is associated and each file would include in the field corresponding to the interest one of the attribute values for the interest. In this way, each file would include information tailored to the possible attribute and interest values into the customer record. For instance, the value for the "type of printing" attribute would determine the selection of a file, for container 108, having a value in the "type of printing" attribute field equal to the value entered for this field in the customer record. In this way, each file in the content database 8 associated with a container has an attribute value in a field (column) corresponding to an attribute value in a field (column) in the customer record. The container would include a query to search the metadata of the files associated with the container for a file that has an attribute value matching the attribute value in the column.

For example, container 110 indicates a "customer type" field, which corresponds to the selection in the customer record entry form of "business" or "technical." A query of this field for business would include a section description more useful for business, non-technical types, such as a general description of functions; whereas a technical value would refer to the file including a technical description. The layout 100 also includes containers 112a, b, c, d to generate the display of product highlights, shown as numbers 60, 62, and 64 in FIG. 3. One or more highlights are filled into the containers 112a, b, c, d from files in the content database 8. Each highlight container 112a, b, c, d includes a query of the metadata in the content database 8 to retrieve the file for the highlights having a column value matching the search value in the corresponding column in the customer record. For instance, the "type of printing field," indicates the type of printing the customer is interested, which is shown as "Continuous forms" in FIG. 2b. The container 112a would insert highlights relating to the type of printing from a file having a "type of printing" metadata field value matching that for the customer record. The "type of printing" highlights are shown as highlights 60 in FIG. 3. For the second container 112b, the query on the "associated services" field (column) would search for the value for this field in the customer record, which is "Distributed print services." This accesses the file having the same value in the "associated services column," which displays the "Environment Sharing" paragraph shown as the highlight numbered 62 in FIG. 3. The third container 112c provides static highlights which are generated directly from the container, without access from either database 6 or 8, fixed and not variable information. These static highlights are features for the product to always include in the marketing material, and shown as number 64 in FIG. 3. The last highlight container 112d retrieves the file having a "customer issues" value matching that of the customer record.

Figure 5B:
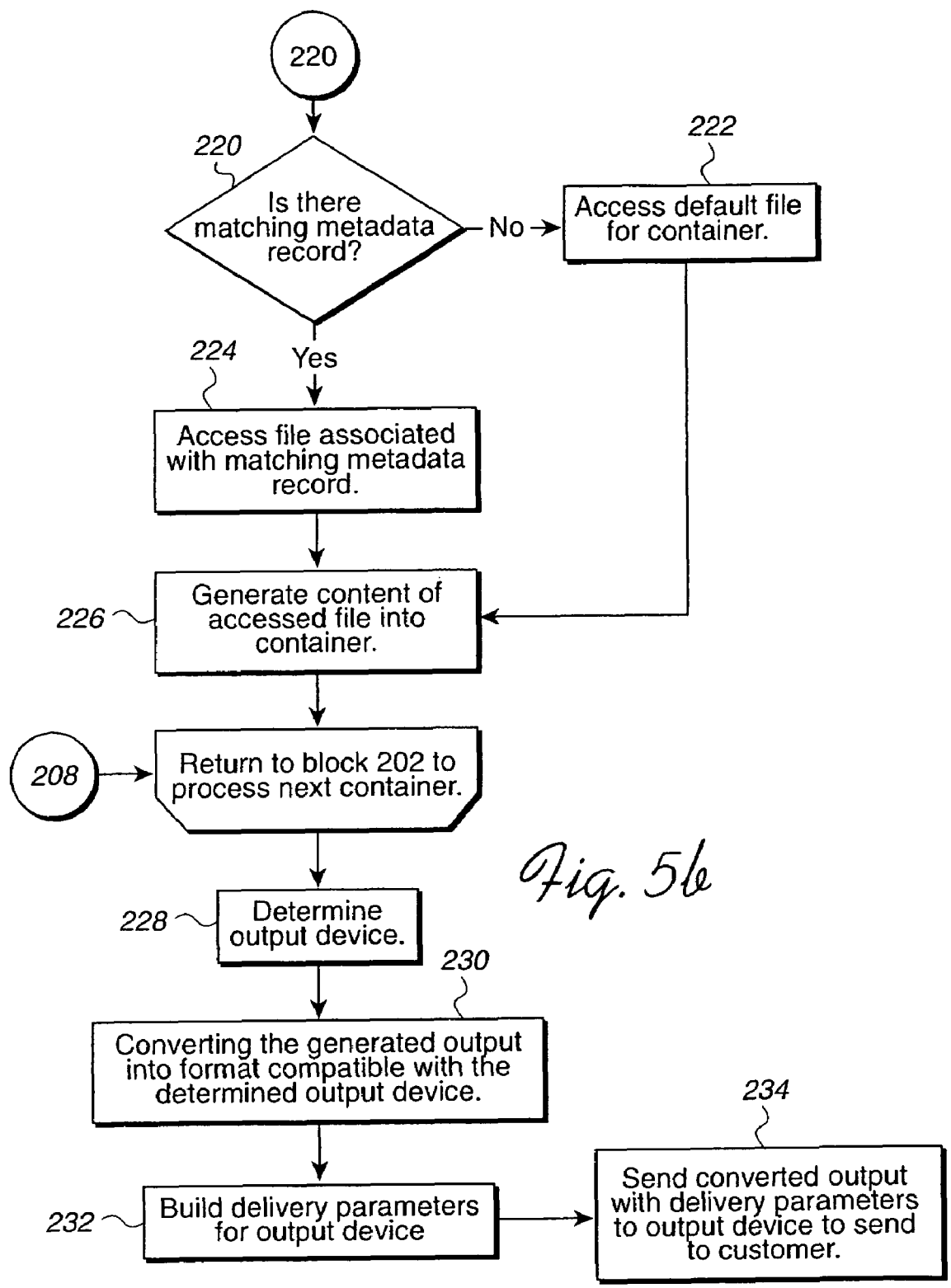

FIGS. 5a, b illustrate logic implemented in the output constructor 10 to process a template 50, the customer database 6, and the content 8 databases to generate marketing output. Control begins (at block 200) with the output constructor 10 receiving a customer record from the customer database 6 and retrieving a template. The output constructor 10 may receive templates and records during a batch processing mode to generate marketing materials from a template for multiple customer records. Alternatively, the output constructor 10 may selectively process customer records to generate the output material. The output constructor 10 then begins a loop at block 202 for each container i in the template. Within the loop, the printer manager first determines (at block 204) whether the content in the container is static, i.e., no variables referencing data in the customer database 6 or the content database 8. If so, the output constructor 10 generates (at block 206) the static text from the container into the output and proceeds (at block 208, in FIG. 5b) to process the next container by returning to block 202. If the content is not static, then the output constructor 10 determines (at block 210) whether a query is included. If not, then the reference must be to a field in the customer record and the data from the customer record for the column (field) identified in the container is accessed (at block 212) from the data in the customer record. The output constructor then generates (at block 214) the text from the container into the output with the variable data from the customer record at the location where the variable was placed. For instance, in container 104 in FIG. 4, there are references to variables corresponding to fields in the customer record to insert in the text to conform the introductory paragraph 104 to the preferences for the customer entered in the customer record. As shown in number 52 in the output in FIG. 3, the introduction paragraph mentions specific key concerns and preferences for the customer. After generation the text into the container, control proceeds (at block 208) back to block 202 to process the next container.

If a query is included in the container, then the output constructor accesses (at block 216) the data in the customer data record column corresponding to the column subject to the query. The output constructor then builds and submits a query (at block 218) to query metadata records in the content database 8 for records for the container i and satisfying the search criteria and value from the customer record. If there is a matching metadata record (at block 220, in FIG. 5b), then the output constructor 10 accesses the file associated with the metadata record and generates (at block 226) the content of the accessed file into the output. If (at block 220), there was no matching data record, then the output constructor 10 would access default content for the container. After generating the content, control returns to block 202 to consider the next container until all containers have been considered. After generating the final output, the output constructor 10 determines the output device, from the customer record, and then sends the generated output to the output device to send to the customer.

The selected output device indicated in the customer record may determine how the output is generated. For instance, if the marketing output will be transferred by e-mail 18, then the document may be transformed into an Adobe Acrobat format, or other portable document format, for transmittal for the e-mail system. For the fax 14 and the printer 14, the output would be similarly tailored to those or any other output devices. The generated output is then converted (at block 230) into a format compatible with the output device. For instance, if the output device is the fax 14, then the output would be converted into the CCIT Group 3 fax format, and if the output device is the e-mail gateway 18, then the output is converted into the Adobe Acrobat PDF format for attachment to an e-mail message to the customer.

The output constructor then builds (at block 232) delivery parameters for the converted output. The delivery parameters would comprise other components to include with the converted output when transmitting through the output device. For instance, for the fax 14, the delivery parameters could define a fax cover page to include with the marketing materials. The output constructor 10 would insert data into the fax cover page from the customer record, e.g., the customer's fax, contact person, etc. For e-mail, the delivery parameters would comprise the e-mail message including customer information in the address fields obtained from the customer record. The output constructor 10 would then transmit (at block 234) the converted output material along with any delivery parameters to the customer via the appropriate output device, e.g., printer 12, fax 14, e-mail 18.

Further, the customer database 6 may include status records, fields or tables associated with customer records indicating the status of generation and transmission of output material for an associated customer record. e.g., whether output material was generated for a customer, transmitted, successfully transmitted, failed, etc. In this way, the customer database 6 serves as the status focal point of the system. An administrator could also query the status records to determine the status of generating and transmitting output material for a given customer record. Further embodiments would include error handling mechanisms if the transmission of the output material via the fax 14 or e-mail gateway 18 fails. The system could automatically query the status records for failed transmissions, and then redrive the transmissions or automatically notify an administrator to take corrective action such as check whether the customer contact and address information is correct.

Preferred embodiments utilize software to format the generated output to align properly in the columns of the marketing material. The template 50 and containers therein may be generated using page layout software known in the art, such as the PAGEFLEX** software, which provides tools for a user to design a layout of containers into which data from a database is generated. This software further expands or shrinks the size of the containers based on the amount of data generated therein, such that each container maintains its relationship as defined in the layout in the output. With this software, text in a container may also be wrapped around any image inserted into the container. Further details of the Pageflex software is described in the publication "Pageflex Server Setup and Reference Guide Version 1.5.1" (Copyright Bitstream Inc., 1998-99), which publication is incorporated herein by reference in its entirety.

Preferred embodiments provide a system, method, and program to tailor marketing material to include information that is relevant to the customer's needs and interests. Further, by using the same layout design across products all the marketing material from the customer has the same look-and-feel. Thus, to the extent the company has a design that is particularly effective in conveying marketing information and associates the company with the material, this design and layout can be utilized for all products and to present the tailored information to the customer. Preferred embodiments provide a system for associating customer interests and demands with particular files that include pertinent information specific to the customer's interests and demands to generate into the output for that customer. In this way, different customers may receive different information in their marketing materials, dependent upon customer interests and demands entered into the customer records.

In preferred embodiments, numerous print requests are batched for different customer records. The batch job is then sent to the output constructor 10 to generate output for the output device 14, 16, and 18 indicated in the record. The formatted template into which all the file contents are generated is then use to create a full color PostScript file along with the delivery output information specified in the customer record. The output constructor 10 then transforms the output PostScript files to a format that is compatible with the customer specified output device 14, 16, and 18, such as an Adobe Acrobat PDF file for e-mail or a fax format, such as CCITT Group 3, known in the art. A delivery routine implemented within the output constructor 10 then takes the delivery formatted output file and manages the printing, e-mailing and faxing of the output. If e-mail or fax is selected as the preferred output method, a hard copy of the PostScript file is printed and mailed to the customer.

Thus, preferred embodiments provide an integrated automated creation and delivery system for gathering customer data, submitting customer data, and then printing in an automated manner. Once the customer specific information is entered into a customer record, then the entire printing processes can generate tailored marketing materials and automatically print or otherwise distribute the output based on a customer preferred output system.

CONCLUSION/ALTERNATIVE EMBODIMENTS

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described with respect to a network system. However, in alternative embodiments, the software and system may be implemented in a single stand alone printer, including the functions performed by the data input computer and printer manager, database program, an e-mail and fax connection, and an attached printer. This would allow a smaller business to utilize the preferred embodiments to design and execute a direct mail campaign to distribute marketing materials. Alternatively, certain of the functions shown as distributed in FIG. 1 may be combined in any manner into one or more systems. For instance, a single computer may include the functions of the output constructor 10 and data input computer 4.

Preferred embodiments described the customer information and metadata describing the files as implemented as database records in a database table. However, the customer and file information may be implemented in any format for maintaining object information, including spreadsheet, non-database table, etc. Thus, as used herein, the terms database record, database table, metadata, and database refer to any data structure known in the art for maintaining information on data objects, such as relational databases, non-relational databases, spreadsheets, ASCII text files, etc.

In further embodiments, there may be numerous data input computers 4 where many operators gather customer information to continually update the customer records in the customer database.

Preferred embodiments were described with respect to corporate users of printer products. However, in further embodiments the customer may comprise individuals as well as businesses. Moreover, the product information represented in the customer records may be for any possible product. In this way, preferred embodiments may be used to target a direct mail or e-mail campaign to numerous individuals. Thus, the term "customer" as used herein refers to any intended recipient of output generated in accordance with preferred embodiments.

Preferred embodiments were described with respect to generating marketing materials. However, in further embodiments, the system of the preferred embodiments may be used to generate material for distribution for non-commercial purpose. For instance, a non-profit organization or election campaign could utilize information to generate materials to distribute to individuals to develop interest in their cause. Alternatively, a corporation or any other person, could use the preferred embodiments to deliver tailored information to a group of people, such as employees, friends, etc.

Preferred embodiments were described with respect to specific information types in the customer records describing customer preferences with respect to a printing system. However, in further embodiments when different products or customers are involved, the customer record may include any number of fields describing any type of customer preference, desire, goal, current products that are used, etc., that could be helpful in creating and selecting content to include in customized marketing materials.

In summary, preferred embodiments disclose a system, method, and program for a automated creation and delivery system for generating customer output information. A customer record in a first database table is interactively generated to include fields specifying at least one product, product demands, product preferences, and a selected output method to deliver output material on the product specified in the customer record. At least one customer record in the first database is received and at least one content file is accessed by processing a second database table using values in one received customer record. The content of each accessed file is then generated into the output material. A selected one of a plurality of delivery options is determined from the customer record and the output material is transmitted via the determined delivery option to the customer specified in the customer record.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A automated creation and delivery method for generating output material, comprising:
   generating a customer record in a first database table to include fields specifying at least one product, customer preferences, and a selected output method to deliver generated output material on the product specified in the customer record;
   receiving at least one customer record in the first database table to process;
   processing a template including queries of records in a second database table;
   accessing at least one value in a field in one customer record to include in at least one query in the template against the second database table;
   applying the at least one query from the template including the at least one value from the customer record against the second database table to determine at least one record associated with at least one content file including fields matching the query;
   accessing the at least one content file associated with the at least one determined record;
   generating the content of the accessed at least one content file into the template to form the output material;
   determining a selected one of a plurality of delivery options from the customer record; and
   transmitting the output material via the determined delivery option to the customer specified in the customer record.

2. The method of claim 1, wherein the customer records in the first database table are generated by a human operator interacting with a customer to determine customer and preferences.

3. The method of claim 1, wherein generating the customer records comprises executing a mining program against a database including customer information to determine information to populate at least one customer record from the customer.

4. The method of claim one 1, wherein the delivery options are members of the set of delivery options consisting of: electronic mail, facsimile, and postal mail.

5. The method of claim 4, further comprising automatically transforming the output material to a format compatible with the selected delivery option, wherein a different format is used for each delivery option, wherein the transformed output is transmitted to the customer via the selected delivery option.

6. The method of claim 4, wherein multiple customer records are processed, and wherein the output generated from the customer records differs for at least two customers and the delivery option used to transmit the output differs for at least two customers.

7. The method of claim 4, wherein the output material is automatically transmitted using one of the selected delivery options after generating the output material and further automatically printed for subsequent postal mailing to a customer street address.

8. The method of claim 1, wherein there are multiple content files for each query, wherein the records associated with the content files for each query have different values in at least one field, wherein determining the record comprises determining the record from the content files associated with the query that matches search criteria of the query.

9. The method of claim 8, wherein each query is maintained in a container in the template, wherein the content file having the associated record that matches the query is generated into the container, further comprising resizing the appearance of the content file content generated into the containers in the output material.

10. The method of claim 9, further comprising accessing data from the customer record to insert into text generated into the container from the accessed content file generated into the container.

11. An automated creation and delivery system for generating output material, comprising:
    means for generating a customer record in a first database table to include fields specifying at least one product, customer preferences, and a selected output method to deliver generated output material on the product specified in the customer record;
    means for receiving at least one customer record in the first database table to process;
    means for processing a template including queries of records in a second database table;
    means for accessing at least one value in a field in one customer record to include in at least one query in the template against the second database table;
    means for applying the at least one query from the template including the at least one value from the customer record against the second database table to determine at least one record associated with at least one content file including fields matching the query;

means for accessing the at least one content file associated with the at least one determined record;

means for generating the content of the accessed at least one content file into the template to form the output material;

means for determining a selected one of a plurality of delivery options from the customer record; and means for transmitting the output material via the determined delivery option to the customer specified in the customer record.

12. The system of claim 11, further comprising means for allowing a human operator to enter the data for the customer records in the first database table when interacting with a customer to determine customer preferences.

13. The system of claim 11, wherein the means for generating the customer records comprises executing a mining program against a database including customer information to determine information to populate at least one customer record from the customer.

14. The system of claim 11, wherein the delivery options are members of the set of delivery options consisting of: electronic mail, facsimile, and postal mail.

15. The system of claim 14, further comprising means for automatically transforming the output material to a format compatible with the selected delivery option, wherein a different format is used for each delivery option, wherein the transformed output is transmitted to the customer via the selected delivery option.

16. The system of claim 14, further comprising means to batch process multiple customer records, wherein the output generated from the customer records differs for at least two customers and the delivery option used to transmit the output differs for at least two customers.

17. The system of claim 14, further comprising:

means for automatically transmitting the output material using one of the selected delivery options after generating the output material; and means for automatically printing the output material for subsequent postal mailing to a customer street address.

18. The system of claim 11, wherein there are multiple content files for each query, wherein the records associated with the content files for each query have different values in at least one field, wherein the means for determining the record comprises determining the record from the content files associated with the query that matches a search criteria of the query.

19. The system of claim 18, wherein each query is maintained in a container in the template, wherein the content file having the associated record that matches the query is generated into the container, further comprising means for resizing the appearance of the content file content generated into the containers in the output material.

20. An article of manufacture for providing an automated creation and delivery system for generating output material, the article of manufacture comprising a computer usable media including at least one computer program embedded therein that is capable of causing at least one computer to perform:

generating a customer record in a first database table to include fields specifying at least one product, customer preferences, and a selected output method to deliver generated output material on the product specified in the customer record;

receiving at least one customer record in the first database table to process;

processing a template including queries of records in a second database table;

accessing at least one value in a field in one customer record to include in at least one query in the template against the second database table;

applying the at least one query from the template including the at least one value from the customer record against the second database table to determine at least one record associated with at least one content file including fields matching the query;

accessing the at least one content file associated with the at least one determined record;

generating the content of the accessed at least one content file into the template to form the output material;

determining a selected one of a plurality of delivery options from the customer record; and transmitting the output material via the determined delivery option to the customer specified in the customer record.

21. The article of manufacture of claim 20, wherein the customer records in the first database table are generated by a human operator interacting with a customer to determine customer and preferences.

22. The article of manufacture of claim 20, wherein generating the customer records comprises executing a mining program against a database including customer information to determine information to populate at least one customer record from the customer.

23. The article of manufacture of claim 20, wherein the delivery options are members of the set of delivery options consisting of: electronic mail, facsimile, and postal mail.

24. The article of manufacture of claim 23, further comprising automatically transforming the output material to a format compatible with the selected delivery option, wherein a different format is used for each delivery option, wherein the transformed output is transmitted to the customer via the selected delivery option.

25. The article of manufacture of claim 23, wherein multiple customer records are processed, and wherein the output generated from the customer records differs for at least two customers and the delivery option used to transmit the output differs for at least two customers.

26. The article of manufacture of claim 23, wherein the output material is automatically transmitted using one of the selected delivery options after generating the output material and further automatically printed for subsequent postal mailing to a customer street address.

27. The article of manufacture of claim 20, wherein there are multiple content files for each query, wherein the records associated with the content files for each query have different values in at least one field, wherein determining the record comprises determining the record from the content files associated with the query that matches a search criteria of the query.

28. The article of manufacture of claim 27, wherein each query is maintained in a container in the template, wherein the content file having the associated record that matches the query is generated into the container, further comprising resizing the appearance of the content file content generated into the containers in the output material.

29. The article of manufacture of claim 28, further comprising accessing data from the customer record to insert into text generated into the container from the accessed file generated into the container.

* * * * *